Oct. 20, 1925.
H. J. McCUE
1,558,028
DRINK DISPENSING STAND
Filed Oct. 30, 1922
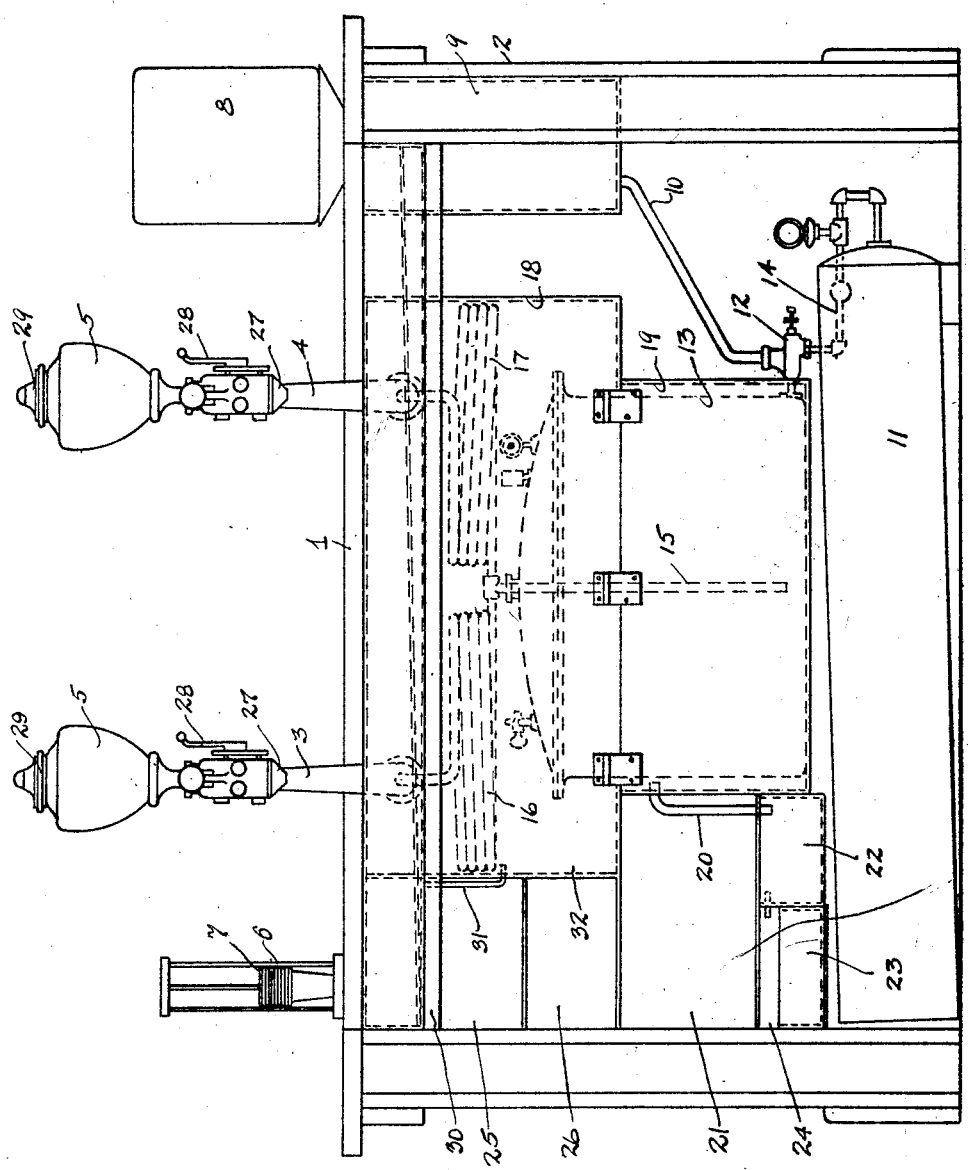
INVENTOR.
Harry J. McCue
BY
Fay, Oberlin + Fay
ATTORNEYS Patented Oct. 20, 1925.

1,558,028

UNITED STATES PATENT OFFICE.

HARRY J. McCUE, OF CLEVELAND, OHIO, ASSIGNOR TO THE H. J. McCUE COMPANY, OF CLEVELAND, OHIO, A CORPORATION OF OHIO.

DRINK-DISPENSING STAND.

Application filed October 30, 1922. Serial No. 597,825.

*To all whom it may concern:*

Be it known that I, HARRY J. McCUE, a citizen of the United States, and a resident of Cleveland, county of Cuyahoga, and State of Ohio, have invented a new and useful Improvement in Drink-Dispensing Stands; of which the following is a specification, the principle of the invention being herein explained and the best mode in which I have contemplated applying that principle, so as to distinguish it from other inventions.

The present invention relates to an improved type of small independent dispensing stand for the serving of liquid beverages made by adding carbonated water to a desired syrup. The principal object of the invention is the provision of a self-contained relatively small counter which may be installed in small stores and the like without the necessity of connecting the counter to the water or drainage systems in the store. To the accomplishment of the foregoing and related ends, said invention, then, consists of the means hereinafter fully described and particularly pointed out in the claim.

The annexed drawing and the following description set forth in detail certain mechanism embodying the invention, such disclosed means constituting, however, but one of various mechanical forms in which the principle of the invention may be used.

In said annexed drawing:—

The single figure there appearing is a rear elevation of my improved counter showing the relation and disposition of the various elements therein.

Many small stores, such as candy stores, cigar stores, news-stands and the like, are unable to install even the cheaper and simpler forms of soad fountains because of their cost and the amount of space they require, and also because of the considerable amount of plumbing which is necessary for the proper installation. The present dispensing apparatus is intended to be entirely self-contained so that it may be installed without plumbing connections, and the space required for it has been reduced to a minimum.

In the drawings there is shown a counter or stand 1 consisting of a box-like casing 2. Mounted on the counter proper are two draft arms 3 and 4, each of which carries a reservoir in the form of a globe 5 containing the syrup which is to be mixed with carbonated water to produce the desired beverages. The construction and operation of the draft arms 3 and 4 forms no part of the present invention, except as a part of the general combination, which will hereinafter be described. At the left of the draft arms is shown a small open container 6 in which cups 7 may be carried, while a suitable sized bottle 8 of distilled or spring water is mounted in an inverted position at the other end of the counter and discharges into a reservoir 9, which in turn is connected by means of a conduit 10 to a carbonating apparatus. The carbonating apparatus consists of a carbonating injector 12, a reservoir 13 and a tank 11 of carbonic acid gas, which is mounted in the bottom of the stand 2 and in such a position that it may be readily removed for replacement. The water is discharged through a conduit 10 and is then blown into the reservoir 13 by the gas coming from the tank 11 through a conduit 14. The tank 13 is ordinarily kept filled, and the carbonated water when desired is drawn off through a conduit 15 running to two coils 16 and 17, which are connected respectively to draft or dispensing arms 3 and 4.

The reservoir 13 and the cooling coils 16 and 17 are cooled by means of ice which is packed around the upper part of the reservoir 13 and around and between the coils 16 and 17, which are contained in a chamber 18 formed in the upper central part of the cabinet 2. In this way the upper portion of the reservoir may be cooled, while the coils 16 and 17 leading to the draft arms are at all times in contact with the ice and are in this way effectively cooled. As the ice melts the water runs down between the outer wall of the reservoir 13 and the wall of the surrounding chamber 19, in which this reservoir is set, and in this way the lower portion of the reservoir is kept at substantially the same temperature as the upper portion which is in contact with the ice. A drain 20 leads from the upper portion of this space between the reservoir and the wall 19 through a compartment 21 and into a chamber 22, where it rises to the top of this chamber before discharging into a removable drawer 23 in an adjoining chamber 24. In this way the chamber 21 is cooled on two of its sides and a portion of the third, and may be used for the storage of other beverages than those which are to be served through the draft arms 3 and 4. Other chambers 25 and 26 are formed above the chamber 21 for the reception of the usual appliances necessary about such a fountain.

In operating the present dispensing apparatus a cup 7 is placed beneath the discharge spout 27 of one of the two draft arms, after which the operating handle 28 of the draft arm is turned in a direction adapting it to discharge a measured quantity of syrup into the cup. The handle is then moved into the second position, which discharges carbonated water until the cup is filled. Any desired syrups can of course be carried in the two containers 5, while several additional bottled beverages can be kept in the compartment 21.

The central portion of the counter 1 is recessed slightly at the back, and below it is mounted a shelf 30, upon which the cups to be filled may be placed, and other articles carried. This shelf is inclined slightly so that any liquid falling upon it will drain toward the left side where it will enter a drain pipe 31 and be discharged into the ice chamber 32 around the cooling coils and the carbonating reservoir.

The particular advantages of the present dispensing cabinet are its simplicity and compactness, and the fact that it is self-contained and requires no connections to be made when it is installed. The water supply is provided by means of the containers 8, and when one container is empty it may be removed and a filled one may be inserted in its place. The tank 11 is also easily removable and is mounted in a convenient position for removal. The drainage from the ice can be removed at intervals by simply pulling out the drawer 23 and emptying it into the drain, while fresh syrups can be introduced into the jars when required by simply removing the covers 29.

Other modes of applying the principle of my invention may be employed instead of the one explained, change being made as regards the mechanism herein disclosed, provided the means stated by the following claim or the equivalent of such stated means be employed.

I therefore particularly point out and distinctly claim as my invention:—

In apparatus of the character described, the combination of a dispensing stand, an ice-receiving cooling chamber mounted therein, a well forming a bottom extension of said cooling chamber, a cooling coil mounted in said chamber, a carbonator seated in said well and projecting into said cooling chamber, and a drain conduit leading from said well adjacent the upper edge thereof.

Signed by me, this 24th day of October, 1922.

HARRY J. McCUE.